UNITED STATES PATENT OFFICE.

EZEKIEL Y. SALMON, OF LYNCHBURG, TENNESSEE.

HOG-CHOLERA COMPOUND.

SPECIFICATION forming part of Letters Patent No. 230,672, dated August 3, 1880.

Application filed Sepember 17, 1879.

*To all whom it may concern:*

Be it known that I, EZEKIEL Y. SALMON, of Lynchburg, in the county of Moore and State of Tennessee, have invented a certain new and useful Hog-Cholera Compound, which is fully described in the following specification.

My compound consists of sublimed sulphur, one pound; copperas, one pound; unslaked lime, five pounds; and water in a sufficient quantity, which are mixed together as follows: mix the sulphur, copperas, and unslaked lime together and add water slowly, and as the process of slaking the lime and the incineration consequent upon the same goes on stir constantly until all the parts are thoroughly and intimately mixed.

The chemical heat generated in the process of mixing, and the incineration which necessarily takes place, forms an entirely new compound, which will not be decomposed by age nor affected by climate, which would not be the case where slaked lime is employed with the other ingredients.

As a cure or preventive for the disease commonly known as "hog-cholera," I take one pound of the compound for every five hogs weighing about one hundred pounds each, and mix with sufficient water, and boil corn in the same until the corn swells, when it should be fed to the swine; or make a swill of similar strength, and give once a day as a cure and once a week as a preventive.

Having thus described my invention, I claim as new and useful—

The hereinbefore-described hog-cholera compound consisting of sublimed sulphur, copperas, and unslaked lime mixed with water in about the proportions substantially as and for the purpose specified.

EZEKIEL YOUNG SALMON.

Witnesses:
JOHN W. MARTIN,
HENRY B. MORGAN.